United States Patent
Siegert et al.

(10) Patent No.: US 11,697,201 B2
(45) Date of Patent: Jul. 11, 2023

(54) EXOSKELETON SYSTEM, CONTROL DEVICE, AND METHOD

(71) Applicant: Universitaet Stuttgart, Stuttgart (DE)

(72) Inventors: Joerg Siegert, Stuttgart (DE); Urs Schneider, Stuttgart (DE)

(73) Assignee: Universitaet Stuttgart, Stuttgart (DE)

( * ) Notice: Subject to any disclaimer, the term of this patent is extended or adjusted under 35 U.S.C. 154(b) by 388 days.

(21) Appl. No.: 16/870,962

(22) Filed: May 9, 2020

(65) Prior Publication Data
US 2020/0346342 A1 Nov. 5, 2020

Related U.S. Application Data

(63) Continuation of application No. PCT/EP2018/080578, filed on Nov. 8, 2018.

(30) Foreign Application Priority Data

Nov. 9, 2017 (DE) .................. 10 2017 126 259.8

(51) Int. Cl.
*B25J 9/00* (2006.01)
*B25J 9/16* (2006.01)
(Continued)

(52) U.S. Cl.
CPC .......... *B25J 9/0084* (2013.01); *B25J 9/0006* (2013.01); *B25J 9/1669* (2013.01); *B25J 9/1674* (2013.01);
(Continued)

(58) Field of Classification Search
CPC ...... B25J 9/0084; B25J 9/0006; B25J 9/1669; B25J 9/1674; B25J 9/1694; B25J 19/02;
(Continued)

(56) References Cited

U.S. PATENT DOCUMENTS 7,774,177 B2    8/2010  Dariush
9,266,233 B2 *  2/2016  Kornbluh ............... B25J 9/0006
(Continued)

FOREIGN PATENT DOCUMENTS

CN    101589983 A    12/2009
CN    101612043 A    12/2009
(Continued)

OTHER PUBLICATIONS

Definition of "Multibody system", from DigitalEngineering247, Accessed Dec. 5, 2022.*
(Continued)

*Primary Examiner* — Jason Holloway
*Assistant Examiner* — Blake A Wood
(74) *Attorney, Agent, or Firm* — Harness, Dickey & Pierce, P.L.C.

(57) ABSTRACT

An exoskeleton system includes a first exoskeleton unit configured to support a first body part, a second exoskeleton unit configured to support a second body part, and a control device. The first exoskeleton unit and the second exoskeleton unit are mechanically decoupled from each other. The control device is configured to control, based on a control model, at least one of the first exoskeleton unit and the second exoskeleton unit. The control model is based on a multibody system that models the first exoskeleton unit, the second exoskeleton unit, and at least one of the first body part and the second body part.

22 Claims, 4 Drawing Sheets

(51) Int. Cl.
*G05B 19/4155* (2006.01)
*B25J 19/02* (2006.01)

(52) U.S. Cl.
CPC ............ *B25J 9/1694* (2013.01); *B25J 19/02* (2013.01); *G05B 19/4155* (2013.01); *G05B 2219/40305* (2013.01)

(58) Field of Classification Search
CPC ...... G05B 19/4155; G05B 2219/40305; G05B 2219/39147; G05B 2219/39155
See application file for complete search history.

(56) References Cited

U.S. PATENT DOCUMENTS

| | | | |
|---|---|---|---|
| 9,655,805 B2 | 5/2017 | Ahn et al. | |
| 9,775,763 B2 | 10/2017 | Aleksov et al. | |
| 10,070,974 B2* | 9/2018 | Herr | A61F 2/70 |
| 10,576,620 B1* | 3/2020 | Chou | A61F 5/0102 |
| 2005/0209536 A1 | 9/2005 | Dariush | |
| 2006/0247904 A1 | 11/2006 | Dariush | |
| 2013/0198625 A1* | 8/2013 | Anderson | G06F 3/016 |
| | | | 715/701 |
| 2017/0143517 A1* | 5/2017 | Sankai | A61B 5/1121 |
| 2017/0202725 A1* | 7/2017 | Robertson | A61H 1/024 |
| 2019/0099877 A1* | 4/2019 | Goehlich | B25J 9/0006 |
| 2019/0133867 A1* | 5/2019 | Goffer | A61H 1/0262 |

FOREIGN PATENT DOCUMENTS

| | | |
|---|---|---|
| CN | 203122695 U | 8/2013 |
| EP | 3 173 191 A2 | 5/2017 |
| KR | 20130038971 A | 4/2013 |

OTHER PUBLICATIONS

Hernandez et al.; Refinement of Exoskeleton Design using Multibody Modeling: An Overview; Robotics and Autonomus Systems; 2015; 10 pages.

Office Action dated Sep. 16, 2022, in corresponding Chinese Application No. 201880072493.6.

* cited by examiner

EXOSKELETON SYSTEM, CONTROL DEVICE, AND METHOD

CROSS-REFERENCE TO RELATED APPLICATIONS

This application is a continuation of International Application No. PCT/EP2018/080578 filed Nov. 8, 2018, which claims priority to German Application No. 10 2017 126 259.8 filed Nov. 9, 2017. The entire disclosures of the applications referenced above are incorporated by reference.

FIELD

The present disclosure relates to the field of body worn assistance systems and in particular a powered endo/exoskeleton system, a control device, and a method of control.

BACKGROUND

Some exoskeletons are known from the state of the art.

Such exoskeletons are generally external support structures, such as armors, which can support or strengthen a wearer's movements, for example by means of joints driven by servo motors. Artificial exoskeletons have for example long been used as orthoses in the medical field. The present disclosure relates to artificial endo- and/or exoskeletons.

Advantageous applications of exoskeletons include medical applications, industrial applications and military applications. In the medical field, exoskeletons are used in particular in the field of rehabilitation robotics and serve as support in case of physical deficits. In the industrial and military sector, exoskeletons are intended to increase the performance of the users, in particular to increase their strength, for example for lifting and transporting heavy loads, and to increase the endurance of the users.

An example of an exoskeleton in the form of an exoskeleton suit is the HAL (Hybrid Assistive Limb) of Tsukuba University, Japan and the robotics company Cyberdyne Inc.

Prior art document EP 3 173 191 A2 discloses a method for estimating a posture of a robotic walking aid.

U.S. Pat. No. 9,655,805 B2 discloses a walking assist robot and control method thereof.

One challenge is to design the mechanical design of the exoskeleton in such a way that the movement of the exoskeleton corresponds to the movement of the user. Preferably, an exoskeleton is adapted to the user's body in such a way that joints of the exoskeleton are located close to the user's joints. Hernandez et al. describe in "Refinement of exoskeleton design using multibody modelling: an overview", CCToMM Mechanics, Machines and Mechatronics ($M^3$) Symposium, 2015, that the design of an exoskeleton can be based on a multibody system of the human body in order to derive the necessary degrees of freedom for the mechanical design of the exoskeleton.

A conventional exoskeleton can be controlled in two ways. Firstly, the exoskeleton can follow a movement specified by the user. For this purpose a movement request of the user can be acquired. For example, a pressure sensor or a torque sensor in a joint of the exoskeleton can detect a movement of the user and the exoskeleton can follow it. Alternatively, an EMG (electromyogram) sensor can be provided which detects the activation of a muscle or muscle group. The exoskeleton can perform a movement corresponding to the activation of the muscle. Hence, only the user's movement or the movement request controls the exoskeleton.

Secondly, in particular in the field of rehabilitation medicine, the exoskeleton can dictate a predefined movement to the user. This allows the user to again learn movement sequences that have been lost, for example, as a result of a stroke.

SUMMARY

The inventors have found that a drawback of existing exoskeleton systems is a relatively imprecise control. The inventors recognized that this is particularly problematic when several people, each carrying an exoskeleton, collaborate. A first approach to solving this problem is to improve the sensor technology used to detect the movement wishes of the users and to thereby enable a more precise control of the individual exoskeletons.

Against this background, it is an object of present invention is to provide an improved exoskeleton system. In particular, it would be desirable to further improve the human-exoskeleton interaction.

According to a first aspect of the present disclosure, it is thus suggested to provide an exoskeleton system, wherein the exoskeleton system includes:
- a first exoskeleton unit adapted to support a first body part;
- a second exoskeleton unit adapted to support a second body part; and
- a control device; wherein the control device is adapted to control the first exoskeleton unit and/or the second exoskeleton unit based on a control model, wherein the control model is based on a multibody system which models
  the first exoskeleton unit,
  the second exoskeleton unit; and
  (at least partially) the first and/or second body part; and
    wherein the first exoskeleton unit and the second exoskeleton unit are mechanically decoupled from each other.

According to a second aspect of the present disclosure, it is suggested to provide a control device adapted to control a first and/or second exoskeleton unit of an exoskeleton system, the exoskeleton system including the first exoskeleton unit adapted to support a first body part and the second exoskeleton unit adapted to support a second body part;
  wherein the control device is adapted to control the first exoskeleton unit and/or the second exoskeleton unit based on a control model, wherein the control model is based on a multibody system which models
  the first exoskeleton unit,
  the second exoskeleton unit; and
  the first and/or second body part; wherein the first exoskeleton unit and the second exoskeleton unit are mechanically decoupled from each other.

According to a third aspect of the present disclosure, it is suggested to provide a method for controlling a first and/or second exoskeleton unit of an exoskeleton system, the exoskeleton system including the first exoskeleton unit adapted to support a first body part and the second exoskeleton unit adapted to support a second body part; wherein the first exoskeleton unit and the second exoskeleton unit are mechanically decoupled from each other; the method including the following steps
  determining a control model, the control model being based on a multibody system which models the first exoskeleton unit, the second exoskeleton unit; and the first and/or second body part; and controlling the first exoskeleton unit and/or the second exoskeleton unit based on the control model.

According to another aspect of the present disclosure, it is suggested to provide a computer program or computer program product with program code adapted to carry out such a method when the computer program product is executed on a data processing equipment.

The proposed solution is particularly advantageous when several users, each carrying an exoskeleton or exoskeleton unit, collaborate. Instead of adding up any errors that may arise in the individual control of the different exoskeleton units of the respective users due to error propagation, a holistic control based on the multibody system can be applied instead. For example, a balanced load distribution between several involved individuals and their exoskeleton units can be achieved, optionally taking into account boundary conditions such as the load states of the exoskeleton units.

The inventors have recognized that, instead of extensively improving the sensor technology for recording the movement requests of the individual users in a complex way, as is the state of the art, and thus only enabling a more precise control of individual exoskeleton units, by taking a holistic view and control as a multibody system the interaction of several exoskeleton units can be further improved.

The exoskeleton system includes a first exoskeleton unit adapted to support a first body part and a second exoskeleton unit adapted to support a second body part. For example, the first exoskeleton unit may be the exoskeleton of a first user and the second exoskeleton unit may be the exoskeleton of a second user. The first exoskeleton unit and the second exoskeleton unit are preferably mechanically decoupled from each other. In other words, the first exoskeleton unit and the second exoskeleton unit can be separate exoskeleton units. In particular, the exoskeleton units are not directly or indirectly coupled with each other by other components. In particular, there is no transmission of force by mechanical coupling. This ensures a high degree of flexibility.

Nevertheless, an superordinate control device is proposed which is adapted to control the first exoskeleton module and/or the second exoskeleton module based on an (adaptive) control model, the control model being based on a multibody system which models both the first exoskeleton unit and the second exoskeleton unit and preferably (at least in part) also the first and/or second body part. By modelling the mechanically decoupled first and second exoskeleton units as components of a common multibody system, the state of the respective other unit can be taken into account when controlling the first and/or second exoskeleton unit. Optionally, the control is further improved by also taking into account the first and/or second body part in the multibody system on which the control model for control is based. In other words, the first and/or the second body part together with the first exoskeleton unit and the second exoskeleton unit can represent a hybrid, which is the basis for the control within the framework of a model-based control.

In the context of the present disclosure, an exoskeleton system can refer to be a body-worn, artificial support system to assist in mechanical activities of one or more users. In the context of the present disclosure, an exoskeleton unit may not be exclusively limited to an external exoskeleton unit, but may also refer to an (at least partially) implantable exoskeleton unit, which may also be referred to as an endoskeleton unit. An example of an implanted exoskeleton unit would thus be an artificial motorized or actuator-operated joint. In the context of the present disclosure, an exoskeleton system is thus to be understood as an exoskeleton and/or endoskeleton system including a first exoskeleton and/or endoskeleton unit for supporting a first body part and a second exoskeleton and/or endoskeleton unit for supporting a second body part, the system and the associated units being referred to in abbreviated form as exoskeleton system and exoskeleton unit.

In the context of the present disclosure, a control device can refer to a closed-loop control device and/or open-loop control device (control unit). Thus a closed or open control loop may be provided.

The first exoskeleton unit can include an actuator adapted to support the first body part. The second exoskeleton unit can include an actuator adapted to support the second body part. The control device can be configured to control the actuator of the first exoskeleton unit and/or the actuator of the second exoskeleton unit based on the control model based on the multibody system. For example, the actuator can be a motor joint for power assistance.

In a refinement, the first body part supported by the first exoskeleton unit may be a body part of a first user. The second body part supported by the second exoskeleton unit may be a body part of a second user. An advantage of this embodiment is that a first user and a second user can collaborate or work together with their respective exoskeleton units. Support provided by the respective exoskeleton units is, because both units are part of the same multibody system and control model, advantageously inter-coordinated. Alternatively, the first exoskeleton unit and the second exoskeleton unit can support different body parts of the same user. For example, selective support of selected body parts such as the left knee and the right elbow or spine can be provided without mechanically coupling the first exoskeleton unit and the second exoskeleton unit. Thus, a targeted and yet coordinated support of individual body parts can take place. At the same time, unnecessary support of intermediate body parts and/or joints that are not affected (as would be the case with a whole-body exoskeleton, for example) can be waived. Advantageously, the weight can be reduced and a movement freedom of the unsupported body parts of the user can be maintained.

In an embodiment, the first exoskeleton unit may include a first actuator adapted to support the first body part and the second exoskeleton unit may include a second actuator adapted to support the second body part. The control device can be configured to control the first actuator of the first exoskeleton unit and/or the second actuator of the second exoskeleton unit based on the control model.

In a refinement, the control device may be adapted to autonomously build the control model of the multibody system based on information about the first exoskeleton unit, the second exoskeleton unit and the first and/or second body part. Such information can be provided via an interface or alternatively can be acquired via sensors. For example, the first and/or second exoskeleton unit may have an identifier based on which a model of these units can be obtained from a database. Accordingly, model information regarding the user, such as height, weight or arm length, can be acquired via an interface or sensors. An advantage of this solution is that the control can be flexibly adapted to the exoskeleton units used and the first and/or second body part. It shall be understood that creating or building the control model with the multibody system can also be understood as an adaptation or parameterization of an already stored control model.

In a refinement, the exoskeleton system may also include a sensor adapted to detect a relative position of the first exoskeleton unit and the second exoskeleton unit with respect to each other. An advantage of this embodiment is that the control can be further improved by allowing the actuation of the exoskeleton units to be coordinated more precisely. It shall be understood that a respective absolute position of the first exoskeleton unit and the second exoskeleton unit can also be acquired and the relative position can be calculated from a difference in the absolute positions. The position can include a spatial position and/or orientation of the units.

In a refinement, the control device may be adapted to further create (build or adapt) the control model adaptively based on at least one context parameter. An advantage of this embodiment is that in addition to the elements of the multibody system, the context in which the system is to operate can also be taken into account.

In a refinement, the control device may be designed to create (build or adapt) the control model adaptively based on a physiological state of a user of the first and/or second exoskeleton unit. A physiological state of the user can for example be understood as a state of health. The physiological state can be based on one or more of heart rate, respiratory rate, oxygen saturation, body temperature, kinetics, kinematics, fluid balance, muscle tone and/or muscle spasm indicator. However, a physiological state of the user shall not refer to a user's wish for movement for controlling the exoskeleton system. For example, if the user's physiological state indicates a seizure, it is likely that the user is or will be performing involuntary movements that the exoskeleton unit should preferably not follow or even reinforce. Furthermore, an increased heart and/or respiratory rate may indicate overexertion of the user, so that a force amplification performance of the exoskeleton unit can be adapted to counteract overexertion. In a further embodiment, the physiological state of the user may also indicate that the user requires medical attention, so that the control model can be adaptively adapted to support the user in the transition to a safe state such as a stable recovery position, for example.

In a refinement, the control device may also be adapted to create or adapt the control model adaptively based on at least one environmental parameter. Example environmental parameters are ambient temperature, air, noise and the like. For example, a higher support level can be provided at elevated temperatures to prevent overexertion of the user.

In a refinement, the control unit can be configured to create or adapt the control model adaptively based on a task to be solved. An advantage of this embodiment is an improved control of the first and/or second exoskeleton unit in view of the task to be solved. In particular, in case of a task to be solved jointly by interaction of the elements of the multibody system, an improved result can be achieved.

An example scenario for a task to be solved jointly is the balancing of a beam, whereby the control is carried out in such a way that the beam is kept levelled. A task can be described as geometric positioning and/or positional change by a temporal sequence of movements. A task can be provided via an interface. The task can also be used as a boundary condition for modelling. For example, if sensitive elements are handled, an upper limit for permissible acceleration values can be defined.

In a refinement, the control device may be designed to correct or adapt a control signal for controlling the first and/or second exoskeleton unit, which is evoked by an interaction of a user with the first and/or second exoskeleton unit, based on the task to be solved and/or based on a state of the multibody system. An advantage of this embodiment is a more precise control. For example, if the task is to support a beam in a horizontal position, excessive lifting of the beam by a user of an certain exoskeleton unit can be dampened so that the beam is merely lifted in a way that it is balanced but not beyond.

In a refinement, the control unit may be adapted to determine a technical integrity of the first and/or second exoskeleton unit and to create or adapt the control model adaptively based on the technical integrity. An advantage of this embodiment is that, for example, failing components or components which are limited in their function can be considered or compensated in the control. If, for example, an actuator of an exoskeleton unit fails due to a technical defect or due to an external influence such as an impact or foreign body such as a bullet, the state of another exoskeleton unit can be adapted in the control system to compensate for the failure or limited functionality of another exoskeleton unit.

In a refinement, the control unit can also be adapted to selectively control the first and/or second exoskeleton unit (depending on a parameter) to support or override the user of the respective exoskeleton unit. In particular, the control device can be adapted to override the user of the respective exoskeleton unit and to control the first and/or second exoskeleton unit such that the multibody system is transitioned into a safe state. For example, a user who suffers a seizure or who is wounded can be assisted in the transition to a safe state, for example, instead of falling, the user can be guided slowly to the ground. In this context, the human being can be considered as a limp component that is guided through the first and/or second exoskeleton unit. Alternatively, the exoskeleton unit may remove the user from a danger zone, for example by supporting or performing a movement out of the danger zone. A safe condition can be understood as a geometrically defined condition which reduces a potential hazard for the user and/or other users or their environment.

Optionally, the control unit can be configured as a distributed control unit, which can, in particular, be distributed over several exoskeleton units. An advantage of this embodiment is a decentralized control. In particular, the distributed control unit can be configured such that a subgroup or part of the distributed control unit can also maintain the overall function. An advantage of this embodiment is that redundancy is provided in the event of failure of one component and safety is increased. In addition, a distributed or modular control unit can be used to improve energy management. For example, the data exchange between the respective exoskeleton units can be reduced and also a local power supply of a control unit associated with a respective exoskeleton unit can be provided, such that not only a single exoskeleton unit has to ensure the supply of power to the control of the entire system.

In a refinement, the first exoskeleton unit and the second exoskeleton unit may include communication circuitry for communication with the control device.

Further advantages can be readily contemplated from the specification and the attached drawing.

It is to be understood, that features mentioned above and those to be explained below may not only be used in the combination respectively provided, but also in other combinations or on their own, without leaving the scope of the present invention.

BRIEF DESCRIPTION OF THE DRAWINGS

Example embodiments of aspects of the invention are illustrated in the attached drawings and are explained in detail in the following description.

DETAILED DESCRIPTION

Figure 1:
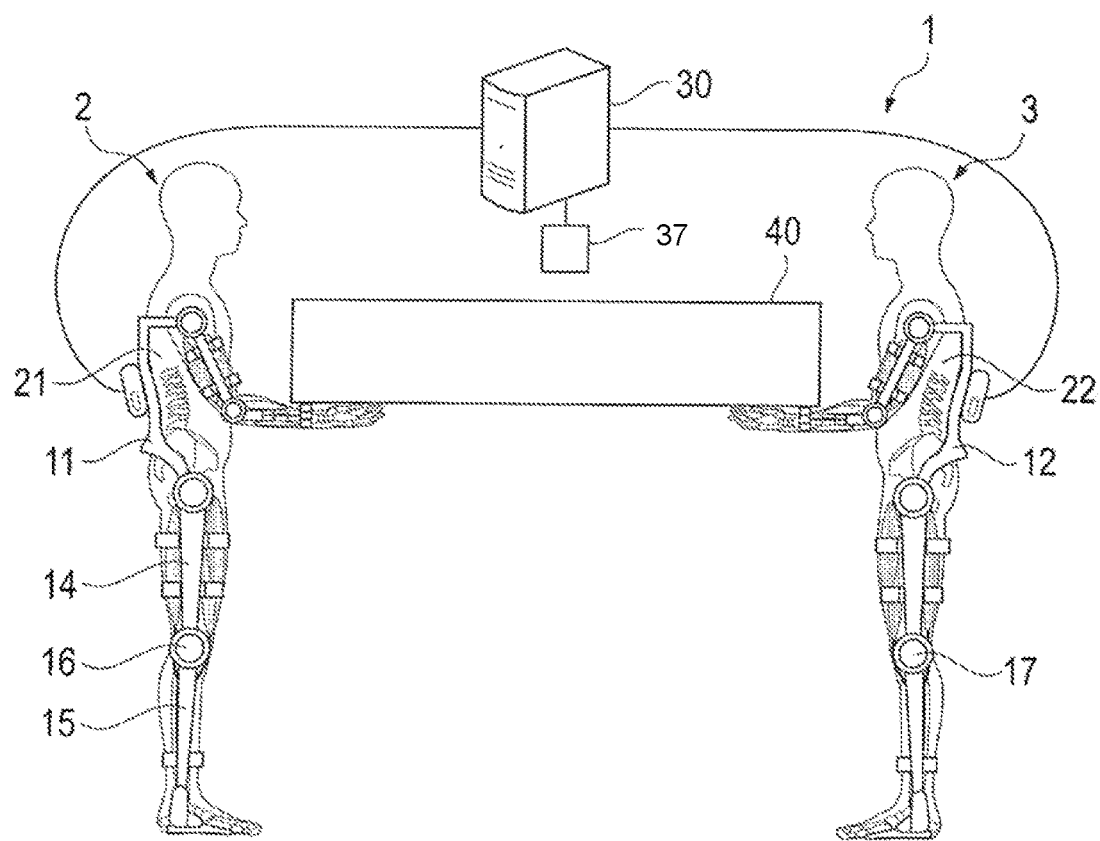
FIG. 1 shows an example of an exoskeleton system in a first application scenario.

FIG. 1 shows an embodiment of an exoskeleton system including a control device according to the present disclosure. The exoskeleton system in its entirety is designated with reference sign 1.

The exoskeleton system 1 includes a first exoskeleton unit 11 adapted to support a first body part 21 and a second exoskeleton unit 12 adapted to support a second body part 22. In the present example embodiment, the first exoskeleton unit 11 and the second exoskeleton unit 12 are both whole-body exoskeletons, which support the entire musculoskeletal system of the first user 2 and the second user 3 from the legs to the spine and arms.

The exoskeleton system 1 further includes a control unit 30. The control device 30 is configured to control the first exoskeleton unit 11 and/or the second exoskeleton unit 12 of an exoskeleton system 1 based on a control model, wherein the control model is based on a multibody system. The multibody system includes or models the first exoskeleton unit 11 and the second exoskeleton unit 12. Furthermore, the multibody system can additionally consider and model the first and/or second body part 21, 22. The first exoskeleton unit 11 and the second exoskeleton unit 12 are mechanically decoupled from each other. In the present example embodiment two separate whole-body exoskeletons are provided.

The exoskeleton unit 11 can include at least two exoskeleton elements 14, 15 which are connected to each other by an actuator 16. In the present, non-limiting example embodiment, this is exemplarily shown as leg support of the user 2, wherein the first exoskeleton element 14 is attached to the user's thigh by means of a first mechanical interface or fastening means and the second exoskeleton element 15 is attached to the user's lower leg by means of a second mechanical interface or fastening means. Thus the actuator 16 can support a movement of the leg of user 2, for example when walking, running, or standing without getting tired. The same applies to the support of the arms and/or the spine of the user. It shall be understood that an exoskeleton unit 11, 12 does not necessarily have to be a whole-body exoskeleton, but can also selectively support individual body parts of the user.

In order to control the first and/or second exoskeleton unit 11, 12, a wired or wireless communication link can be established with the first and/or second exoskeleton unit 11, 12. For this purpose, the exoskeleton units 11, 12 and the control device 30 may have respective communication circuitry.

In the illustrative scenario shown here as an example, the task of the first and second user 2, 3 can be to transport a heavy object 40 and keep it perfectly level in the horizontal. This is already a difficult task without exoskeleton support, in particular when climbing stairs. Conventional exoskeletons can separately support the first user 2 and the second user 3 with the mechanical load. The users must coordinate precisely with each other. However, imprecise control of the respective separate exoskeletons can make balancing the item 40 even more difficult. Even if exoskeletons of identical construction are used, at least the kinematics and kinetics of the bodies of the first user 2 and the second user 3 differ. As the first exoskeleton unit 11 and the second exoskeleton unit 12 are mechanically decoupled from each other, it is also not possible to provide compensation by means of a mechanical coupling.

According to the present disclosure it is thus proposed to provide a control device 30, wherein the control device is adapted to control the first exoskeleton unit 11 and/or the second exoskeleton unit 12 based on a control model, wherein the control model is based on a multibody system which models the first exoskeleton unit 11, the second exoskeleton unit 12 and preferably the first and/or second body part 21, 22. As the control is based on this multibody system, a more precise control of the exoskeleton units 11, 12 can be achieved.

Figure 2:
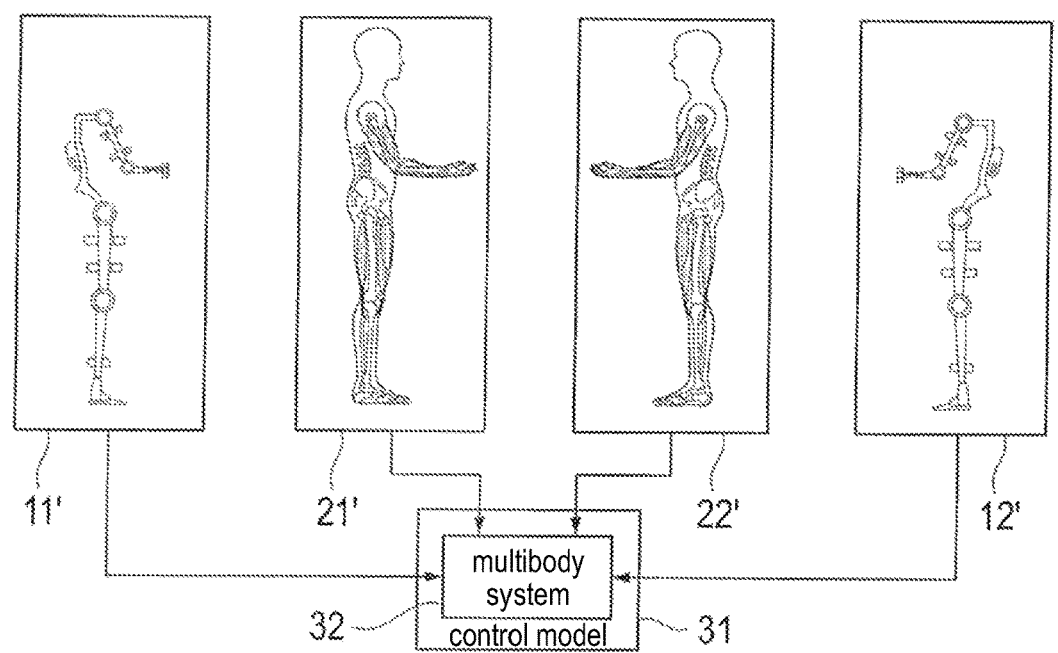
FIG. 2 shows a block diagram of an example of components and influencing factors of a control model as a basis for the control device to control the first and/or second exoskeleton unit.

FIG. 2 illustrates the creation of a control model 31 based on a multibody system 32, which is based on information 11' about the first exoskeleton unit 11, information 12' about the second exoskeleton unit 12 and information 21' or 22' about the first and/or second body part 21, 22. The information can be made available to the control device 30 of FIG. 1 via an interface. Alternatively, one or more sensors may be provided to acquire the required information and make it available to the control device 30 of FIG. 1. It is also possible that sensors of the first and/or second exoskeleton unit 11, 12 provide information for modelling the first and/or second body part. For example, information about an inertia or kinetics of the first and/or second body part can be acquired by means of motion sensors, such as acceleration sensors or gyroscopes. Furthermore, by adapting an exoskeleton unit 11, 12, for example to a length of the body part to be supported, additional information about the body part to be supported 21, 22 can be obtained.

As shown in FIG. 1, the exoskeleton system 1 may also include one or more sensors 37 to detect a relative position of the first exoskeleton unit 11 with respect to the second exoskeleton unit 12. For example, the relative position can be determined using known methods such as triangulation and time-of-flight measurement of wirelessly transmitted communication signals from the first exoskeleton unit 11 and the second exoskeleton unit 12 to the sensors 37, although other methods can also be used to determine the position.

Figure 3:
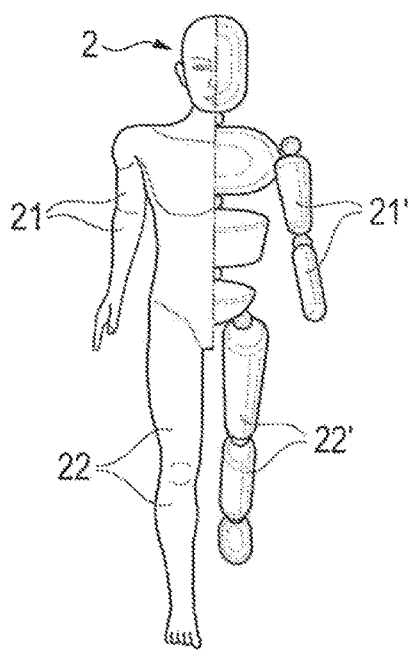
FIG. 3 shows another embodiment of an exoskeleton system.

FIG. 3 shows a schematic diagram of a human body 2 with several body parts 21, 22, whereby, for example, the arm is referred to as the first body part 21 and the leg as the second body part 22.

Figure 4:
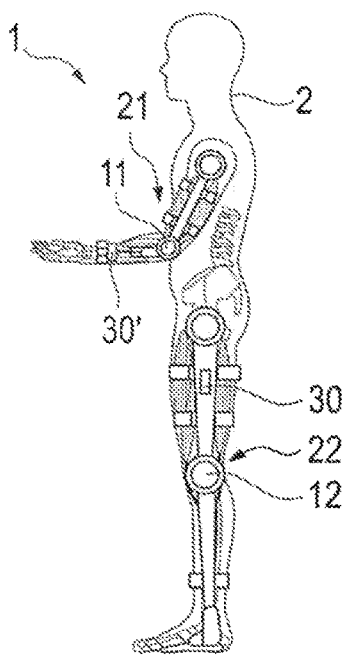
FIG. 4 an example modeling of a human body as a multibody system.

FIG. 4 shows another embodiment of an exoskeleton system 1 according to another embodiment of the present disclosure. The exoskeleton system 1 again includes a first exoskeleton unit 11 to support a first body part 21, a second exoskeleton unit 12 to support a second body part 22 and a control device 30. In the present case, however, the first body part 21 and the second body part 22 are, in contrast to FIG. 1, body parts of the same user 2. This may for example be advantageous if a whole body exoskeleton is not desired or not necessary and only selective support of individual body parts of the same user 2 is desired. In the present example, for example, an elbow joint as well as a knee joint, i.e. an arm as first body part 21 is supported by the first exoskeleton unit 1 and a leg as second body part 22 is supported by the second exoskeleton unit 2.

Optionally, the control device 30 may be configured as a distributed control device, whereby at least some of the functions are implemented in element 30 and some of the functions in element 30'. A further advantage of this embodiment is that by a distributed control unit redundancy can be provided, thereby increasing reliability.

Figure 5:
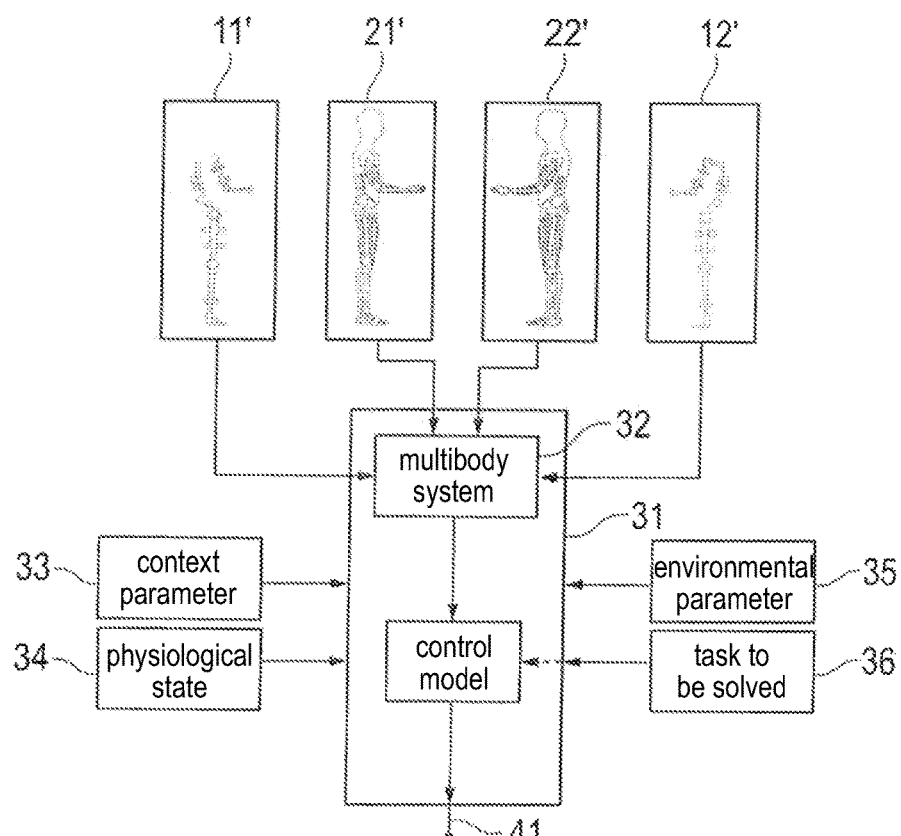
FIG. 5 is a block diagram of another example of components and influencing factors of a control model as a basis for the control device to control the first and/or second exoskeleton unit.

FIG. 5 shows a block diagram which illustrates several optional advantageous refinements of the control unit 30 or of its control model 31. In order to avoid repetitions, only differences with respect to FIG. 2 will be discussed. Preferably the control unit 30 is configured to create or adapt the control model 31 adaptively based on at least one context parameter 33. The context parameter 33 can be provided by an optional sensor or made available via an interface. For example, the context parameter can describe or specify the position of the modules relative to each other. Optionally, the control device can also be adapted to create the control model adaptively based on a physiological state 34 of a user of the first and/or second exoskeleton unit. For example, a sensor for acquiring a physiological parameter, such as the heart rate or respiratory rate, can be provided for this purpose. Alternatively or in addition, a skin conductivity can also be measured. For example, sweating is a good indicator of stress. Preferably, the control system can therefore be adapted to reduce the user's stress. For example, the support can be increased or, if the exoskeleton performs movements at too high a speed or too sensitively, optional damping can be provided in the control model.

Optionally, the control unit can be adapted to create the control model adaptively based on at least one environmental parameter 35. The environmental parameter can be acquired by a sensor or made available via an interface. For example, at higher temperatures and an expected higher load on the user, a higher support level can be selected, whereas under favorable conditions a lower support level can be selected, for example to reduce power consumption.

Optionally, the control unit can be adapted to create the control model adaptively based on a task 36 to be solved. Optionally, task 36 can include of or be broken down into one or more subtasks. For example, there may be different subtasks for the first or second exoskeleton unit. Based on the multibody system and the task to be performed by the multibody system, the control unit can optionally calculate parameters for controlling the first and/or second exoskeleton unit or optionally perform a parameter optimization. Referring to FIG. 1, the task may, for example, be to keep an object or load 40 in a balanced horizontal state. Thus, the control model can take this task into account in the control model 31 of the control device 30 and convert control signals provided by the first and/or second user into an advantageous control of the first and/or second exoskeleton unit in order to solve this task (in the best possible way).

In other words, the control device 30 can preferably be adapted to correct or adapt a control signal 41 for driving the first and/or second exoskeleton unit 11, 12 caused by an interaction of a user 2, 3 with the first and/or second exoskeleton unit 11, 12 depending on the task to be solved 36 and/or based on a state of the multibody system 32.

Optionally, the control unit can further be adapted to determine a technical integrity of the first and/or second exoskeleton unit 11, 12 and to further adaptively create or adapt the control model 31 based on the technical integrity. If, for example, it is determined that one of the actuators of the exoskeleton system is subject to overheating, the control can effect a change which reduces the load on this actuator and, for example, provides the necessary mechanical support by one or more other actuators. For example, if an actuator at an elbow joint is under too much stress, a movement from the leg area may provide support.

Figure 6:
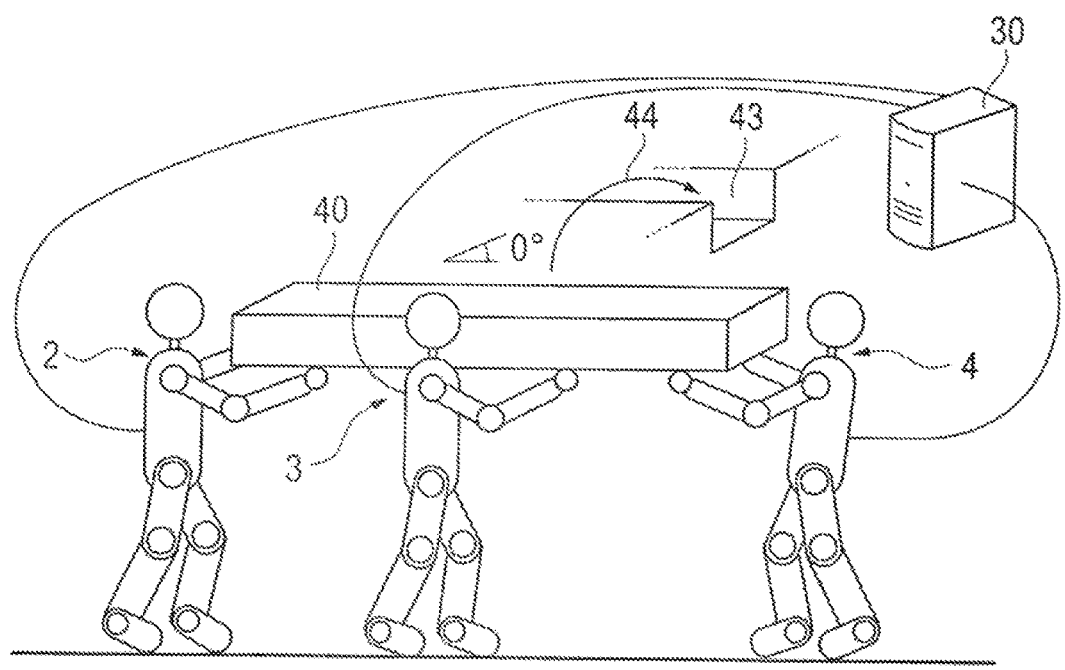
FIG. 6 shows another application scenario of an exoskeleton system.

FIG. 6 shows a further application scenario in which a first user 2, a second user 3 and a third user 4 want to carry a load 40 together in a balanced manner and then place it in a coordinated manner in a recess 43, as illustrated by arrow 44. The task is therefore to carry and deposit a load in a coordinated manner. An advantage of the proposed solution is that the control device 30 can control the participating exoskeleton units of users 2, 3 and 4 in such a coordinated manner that, for example, equal load distribution is achieved, whereby the load is distributed equally among the first, second and third users 2, 3, 4. It shall be understood that depending on the capability of the respective users and their exoskeleton units a different distribution is possible. Optionally, a charge state of the respective exoskeleton units and/or their technical integrity can also be taken into account. A further advantage of the proposed solution is that thanks to the common control model, which is based on a multibody system, the placing of the heavy load can be synchronized, so that any damage when placing the load in a narrow opening can be avoided or at least reduced.

Figure 7:
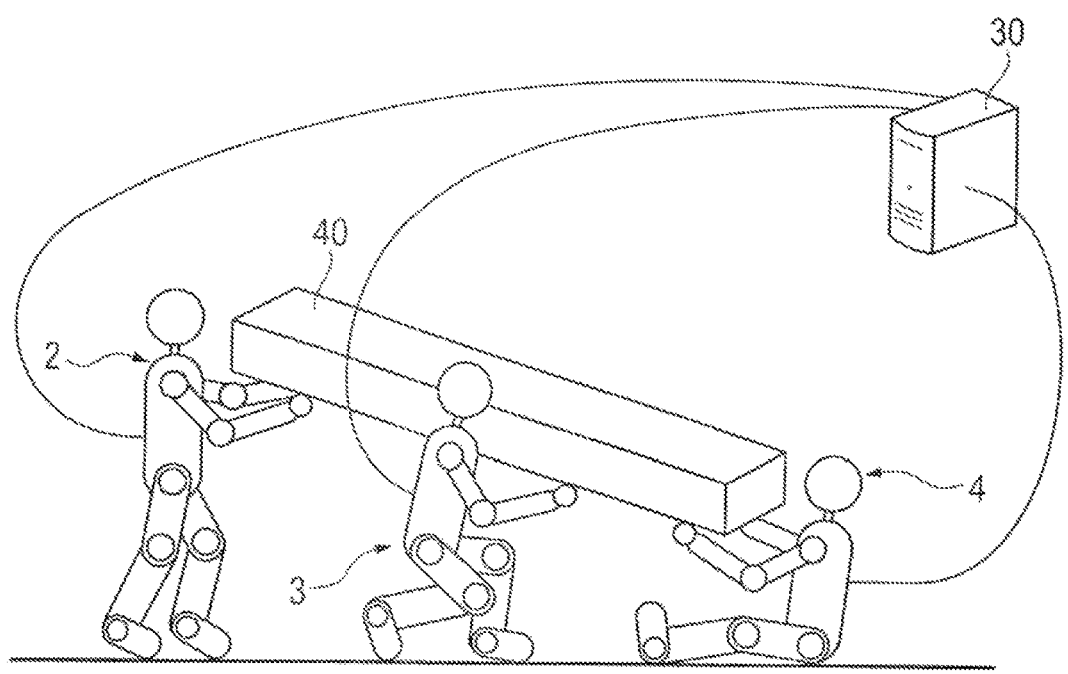
FIG. 7 shows another application scenario of an exoskeleton system.

FIG. 7 shows a modified scenario in which user 4 fell unintentionally. Herein, the control unit 30 is adapted to adapt the control model adaptively based on the task to be solved, but also to adapt the task to be solved. In the present case, the adapted task to be solved can therefore be seen in protecting user 4 from injury.

Referring to FIG. 7, the control device can be adapted to selectively control the first and/or second or even further exoskeleton units to support or override the user of the respective exoskeleton unit. In the present case it may be useful to override users 2, 3, 4 of the respective exoskeleton units and to control the exoskeleton units in such a way that the multibody system is transitioned into a safe state. For example, the exoskeletons 11, 12 of the first and second user 2, 3 can be controlled in such a way that the load is not dropped with shock and thus the third user 4 suffers harm, but additional power is provided for the actuators of the exoskeletons to compensate for the lack of support by the third user 4 and to protect him from damage.

Figure 8:
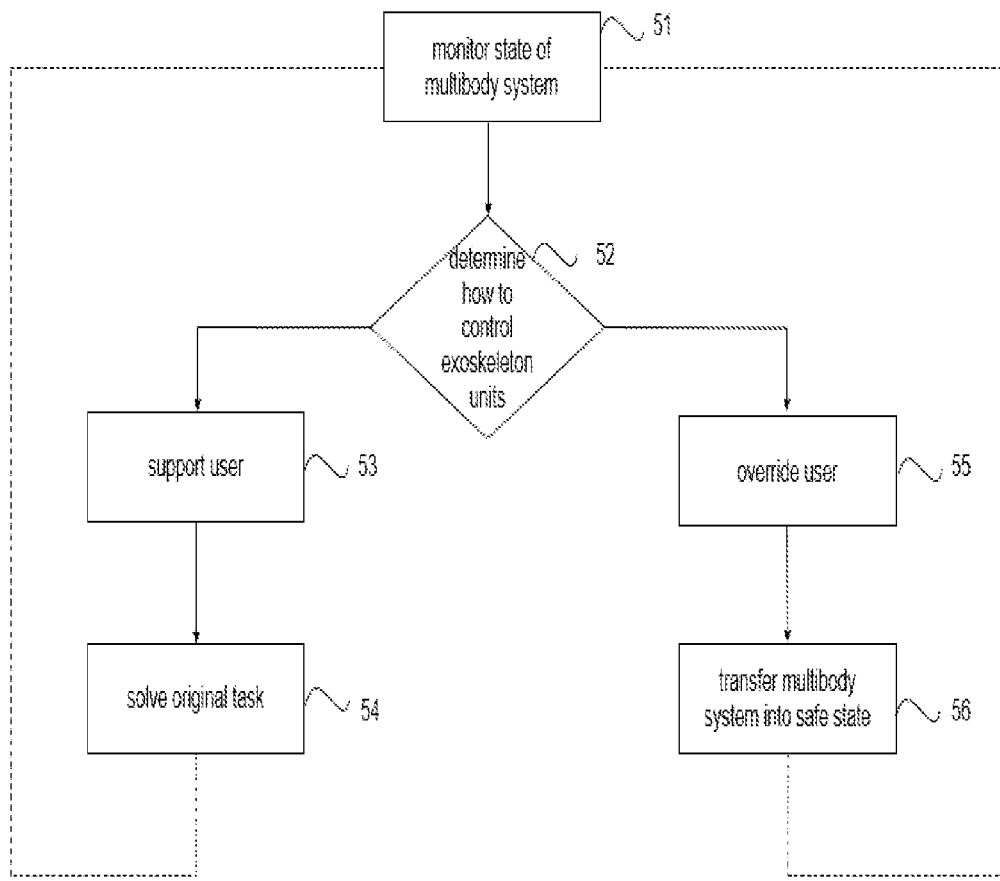
FIG. 8 is a flowchart of a method to control a first and/or second exoskeleton unit of an exoskeleton system.

FIG. 8 illustrates this method once again. In step 51, the state of the multibody system is monitored, whereby in step 52 a decision is made whether the first and/or second exoskeleton unit 11, 12 are to be controlled in such a way that the user of the respective exoskeleton unit is supported, in step 53, for example, to solve the original task in step 54. Alternatively, the first and/or second exoskeleton unit 11, 12 may be selectively controlled, based on the decision in step 52, in order to override the user of the respective exoskeleton unit in the subsequent step 55 and to transfer the multibody system into a safe state 56.

In the further course of the process, the multibody system can again be transferred into a state that serves to solve the original task. For example, with reference to FIG. 7, the first and second users 2, 3 can temporarily carry the load 40 in pairs, user 4 can stand up and then participate in the task again.

Figure 9:
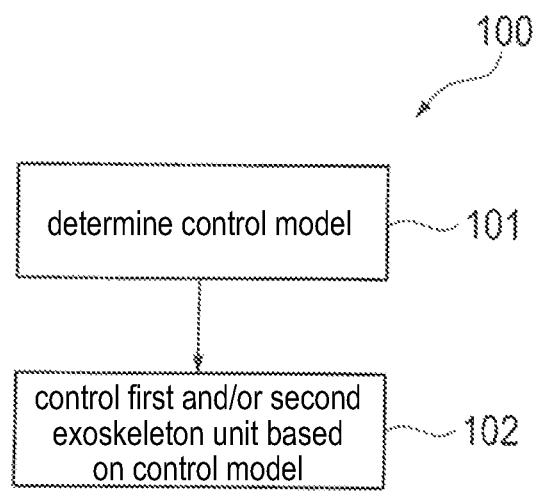
FIG. 9 is a flowchart of a method for controlling a first and/or second exoskeleton unit of an exoskeleton system.

FIG. 9 shows a flowchart of a method 100 for controlling a first and/or second exoskeleton unit 11, 12 of an exoskeleton system 1, the exoskeleton system including the first exoskeleton unit adapted to support a first body part 21 and the second exoskeleton unit 12 adapted to support a second body part 22, wherein the first exoskeleton unit 11 and the second exoskeleton unit are mechanically decoupled from each other. In a first step 101 a control model is determined, wherein the control model is based on a multibody system which at least partially models the first exoskeleton unit 11, the second exoskeleton unit 12 and the first and/or second body part 21, 22. In a second step 102, the first exoskeleton unit 11 and/or the second exoskeleton unit 12 is controlled based on the control model 31.

In conclusion, in particular an exoskeleton system is described, which may enable an advantageous interaction of a first exoskeleton unit 11 and a second exoskeleton unit 12, whereby the first exoskeleton unit 11 and the second exoskeleton unit 12 are mechanically decoupled from each other. Instead of considering the first exoskeleton unit 11 and the second exoskeleton unit 12 separately, it is suggested to provide a control device with an advantageous control model based on a multibody system which takes into account both the first exoskeleton unit and the second exoskeleton unit. Advantageously, in the multibody system, the first and/or second body part supported by the respective exoskeleton units are also modelled and also taken into account in the control of the first and/or second exoskeleton unit, whereby the control can be further refined and a beneficial interaction, in particular of a plurality of exoskeleton units of different users or body parts, can be enabled.

Further advantageous application scenarios for the proposed solution can, for example, be found in the field of civil protection, for example to support and coordinate rescue teams equipped with exoskeleton units, in the field of rehabilitation medicine, or in competitive sports for training purposes, for example to learn optimized movement sequences with the help of exoskeleton units.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The phrase at least one of A, B, and C should be construed to mean a logical (A OR B OR C), using a non-exclusive logical OR, and should not be construed to mean "at least one of A, at least one of B, and at least one of C."

What is claimed is:

1. An exoskeleton system comprising:
    a first exoskeleton unit configured to support a first body part;
    a second exoskeleton unit configured to support a second body part; and
    a control device,
    wherein the control device is configured to control, based on a control model, the first exoskeleton unit and the second exoskeleton unit,
    wherein the control model is based on a multibody system that models:
        the first exoskeleton unit;
        the second exoskeleton unit; and
        at least one of the first body part and the second body part,
    wherein the first exoskeleton unit and the second exoskeleton unit are mechanically decoupled from each other, and
    wherein controlling the first and second exoskeleton units based on the control model includes controlling each of the first and second exoskeleton units based on a state of the other one of the first and second exoskeleton units.

2. The exoskeleton system of claim 1, wherein:
    the first body part supported by the first exoskeleton unit is a body part of a first user; and
    the second body part supported by the second exoskeleton unit is a body part of a second user.

3. The exoskeleton system of claim 1, wherein:
    the first exoskeleton unit comprises a first actuator for supporting the first body part;
    the second exoskeleton unit comprises a second actuator for supporting the second body part; and
    the control device is configured to control, based on the control model, at least one of the first actuator of the first exoskeleton unit and the second actuator of the second exoskeleton unit.

4. The exoskeleton system of claim 1, wherein the control device is configured to autonomously create the control model with the multibody system based on information about the first exoskeleton unit, the second exoskeleton unit, and at least one of the first body part and the second body part.

5. The exoskeleton system of claim 1, further comprising a sensor configured to detect a relative position of the first exoskeleton unit and the second exoskeleton unit with respect to each other.

6. The exoskeleton system of claim 1, wherein the control device is configured to adaptively create the control model based on at least one context parameter.

7. The exoskeleton system of claim 1, wherein the control device is configured to adaptively create the control model based on a physiological state of a user of at least one of the first exoskeleton unit and the second exoskeleton unit.

8. The exoskeleton system of claim 1, wherein the control device is configured to adaptively create the control model based on at least one environmental parameter.

9. The exoskeleton system of claim 1, wherein the control device is configured to adaptively create the control model based on a task to be solved.

10. The exoskeleton system of claim 1, wherein the control device is configured to correct a control signal for controlling the first and/or second exoskeleton unit, which is caused by an interaction of a user with the first and/or second exoskeleton unit, depending on a task to be solved.

11. The exoskeleton system of claim 10, wherein the control device is configured to correct the control signal based also on a state of the multibody system.

12. The exoskeleton system of claim 1, wherein the control device is configured to correct a control signal for controlling the first and/or second exoskeleton unit, which is caused by an interaction of a user with the first and/or second exoskeleton unit, based on a state of the multibody system.

13. The exoskeleton system of claim 1, wherein the control device is configured to:

determine a technical integrity of the first exoskeleton unit and a technical integrity of the second exoskeleton unit;

adaptively build the control model based on the technical integrity of the first exoskeleton unit and the technical integrity of the second exoskeleton unit; and control each of the first and second exoskeleton units based on the technical integrity of the other one of the first and second exoskeleton units.

14. The exoskeleton system of claim 1, wherein the control device is configured to selectively control at least one of the first exoskeleton unit and the second exoskeleton unit to at least one of support and override a user of the at least one of the first exoskeleton unit and the second exoskeleton unit.

15. The exoskeleton system of claim 14, wherein the control device is configured to override the user of the at least one of the first exoskeleton unit and the second exoskeleton unit and to control the first and/or second exoskeleton unit such that the multibody system is transitioned into a safe state.

16. The exoskeleton system of claim 1, wherein the control device is configured as a distributed control device that is distributed over a plurality of exoskeleton units.

17. The exoskeleton system of claim 1, wherein each of the first exoskeleton unit and the second exoskeleton unit comprise communication circuitry configured to communicate with the control device.

18. A control device for an exoskeleton system including a first exoskeleton unit configured to support a first body part and a second exoskeleton unit configured to support a second body part, the control device comprising:

first circuitry configured to drive the first exoskeleton unit and the second exoskeleton unit; and second circuitry configured to control the first circuitry based on a control model, wherein the control model is based on a multibody system that models:
 the first exoskeleton unit;
 the second exoskeleton unit; and
 at least one of the first body part and the second body part, wherein the first exoskeleton unit and the second exoskeleton unit are mechanically decoupled from each other, and wherein controlling the first circuitry based on the control model includes controlling each of the first and second exoskeleton units based on a state of the other one of the first and second exoskeleton units.

19. A method for an exoskeleton system including a first exoskeleton unit configured to support a first body part and a second exoskeleton unit configured to support a second body part, the first and second exoskeleton units being mechanically decoupled from each other, the method comprising:

determining a control model, wherein the control model is based on a multibody system that models:
 the first exoskeleton unit;
 the second exoskeleton unit; and
 at least one of the first body part and the second body part; and controlling the first exoskeleton unit and the second exoskeleton unit based on the control model, wherein controlling the first and second exoskeleton units based on the control model includes controlling each of the first and second exoskeleton units based on a state of the other one of the first and second exoskeleton units.

20. A non-transitory computer program product comprising program code configured to execute a method when the computer program product is executed on a data processing device, the method comprising:

determining a control model, wherein the control model is based on a multibody system that models:
 a first exoskeleton unit configured to support a first body part;
 a second exoskeleton unit configured to support a second body part,
 wherein the first and second exoskeleton units are mechanically decoupled from each other; and
 at least one of the first body part and the second body part; and controlling the first exoskeleton unit and the second exoskeleton unit based on the control model, wherein controlling the first and second exoskeleton units based on the control model includes controlling each of the first and second exoskeleton units based on a state of the other one of the first and second exoskeleton units.

21. The exoskeleton system of claim 1, further comprising controlling each of the first and second exoskeleton units based on a load capability of the other one of the first and second exoskeleton units.

22. The exoskeleton system of claim 1, further comprising controlling each of the first and second exoskeleton units based on a charge capacity of the other one of the first and second exoskeleton units.

* * * * *

UNITED STATES PATENT AND TRADEMARK OFFICE
CERTIFICATE OF CORRECTION

PATENT NO. : 11,697,201 B2
APPLICATION NO. : 16/870962
DATED : July 11, 2023
INVENTOR(S) : Joerg Siegert et al.

It is certified that error appears in the above-identified patent and that said Letters Patent is hereby corrected as shown below:

On the Title Page

At page 2, Column 2, Item (56) Other Publications, Line number 2, delete "Autonomus:" and insert --Autonomous-- therefor In the Claims At Column 14, Line number 29, in Claim 20, after "part," delete "¶"

Signed and Sealed this
Seventeenth Day of October, 2023

*Katherine Kelly Vidal*
*Director of the United States Patent and Trademark Office*